United States Patent [19]

Roberts et al.

[11] Patent Number: 5,981,270

[45] Date of Patent: Nov. 9, 1999

[54] BIO-CATALYTIC OXIDATION REACTOR

[75] Inventors: Gary Dean Roberts, Riverton, Utah; Verlin Jay Roberts, Ovid, Id.

[73] Assignee: LifeLine Enterprises LLC, Riverton, Utah

[21] Appl. No.: 09/064,529

[22] Filed: Apr. 21, 1998

[51] Int. Cl.[6] .................................................. C05F 9/02
[52] U.S. Cl. ................................. 435/290.3; 435/290.4; 435/286.6; 366/220
[58] Field of Search ................... 435/262, 290.2, 435/290.3, 290.4, 286.6, 286.7; 71/8–10; 422/209; 366/220, 225, 227, 228, 233

[56] References Cited

U.S. PATENT DOCUMENTS

| | | |
|---|---|---|
| 2,241,734 | 5/1941 | Petersen . |
| 2,954,285 | 9/1960 | Carlsson et al. . |
| 3,178,267 | 4/1965 | Larson . |
| 3,245,759 | 4/1966 | Eweson . |
| 3,676,074 | 7/1972 | Shibayama et al. ................. 435/290.3 |
| 4,028,189 | 6/1977 | Fagerhaug et al. .................. 435/290.3 |
| 4,374,804 | 2/1983 | Easter, II . |
| 5,244,804 | 9/1993 | Horkan et al. . |
| 5,591,635 | 1/1997 | Young et al. ......................... 435/290.3 |

FOREIGN PATENT DOCUMENTS 48 37 865   5/1990   Germany ............................ 435/290.3

*Primary Examiner*—William H. Beisner
*Attorney, Agent, or Firm*—Robert B. Crouch

[57] ABSTRACT

The present invention relates to a bio-catalytic oxidation reactor for remediation of organic wastes and more particularly to a bio-reactor for optimizing the process of oxidation reduction, or composting, of organic wastes or by-products. The reactor includes an elongated cylindrical vessel supported for rotation and includes loading and discharge chutes mounted on the ends of the vessel which include feed assemblies mounted to the vessel end plates such that the feed assemblies rotate when the vessel rotates.

15 Claims, 3 Drawing Sheets

BIO-CATALYTIC OXIDATION REACTOR

The present invention relates to a bio-catalytic oxidation reactor for remediation of organic wastes and more particularly to a bio-reactor for optimizing the process of oxidation reduction, or composting, of organic wastes or by-products.

BACKGROUND

The decomposition or decay of organic matter is a natural process which is accomplished by bacteria and fungi. The decay or oxidation-reduction process requires a food supply in the form of carbon, nitrogen and vitamins, plus an adequate supply of oxygen. An oxidation bioreactor must, therefore, breathe, i.e., oxygen must enter and carbon dioxide must be exhausted from the bio-reactor. If there is insufficient oxygen to sustain the aerobic bacteria they will be replaced by anaerobic, non-oxygen consuming bacteria, and the decomposition process will slow and become incomplete, i.e., a residue of sludge will be left which must be further processed.

In the aerobic decay process the bacterial decomposition of organic matter is carried out by successive strains of bacteria which are activated at different temperatures. In a batch operation the decay process is initiated by cool-temperature bacteria known as psychrophiles which function best at about 45–55° F. They attack the organic matter and burn off or oxidize the carbon compounds, thus producing heat as a by-product. A rise in temperature, either from bacterial activity or higher atmospheric temperature, will activate strains of warm-temperature bacteria called mesophiles which are most active at 70–90° F. The mesophiles feed with such intensity that they raise the ambient temperature to a point where the environment within the reactor is no longer compatible to them. This occurs at about 104° F., where high-temperature bacteria called thermophiles are activated. The thermophiles then raise the ambient temperature until it stabilizes at approximately 158° F. where they complete their work. The decaying material will then return to near normal atmospheric temperature and the mesophiles become active again until bacterial decomposition is nearly complete. While the bacterial decomposition is taking place, a wide variety of other micro-organisms are at work in the decaying material. For instance, psychrophilic, mesophilic and thermophilic fungi help break down cellulose and lignin during all of the temperature phases of the process. Actinomycetes, which are part bacteria and part fungi, clean up after the bacteria by consuming the tough cellulose, starches, proteins and lignin. In addition, enzymes, which are produced by bacteria, remain active in reducing the toughest constituents of the compost long after the parent bacteria have died.

In a typical garden composting effort, vegetation and food scraps are deposited in a pile which is aerated periodically by manually turning the material with a garden fork. This process is laborious, slow and annoying since it takes upward of six months to complete and the decaying material produces odors and attracts flies and other pests. Commercial batch composters have been proposed to contain or enclose the composting process within a cylindrical tank which has been mounted on rollers for rotation. The tank is typically loaded with organic material to approximately one-half of its volume. In such a composter the decaying material, and the associated odors, are confined within the tank where the material is protected from pests and then aerated or tumbled by periodic turning of the tank itself. Such devices are an improvement over the well known compost piles, since they limit the physical labor required while removing the annoyance of odors and pests and they reduce the time required to compost a batch of material to between two and four weeks.

SUMMARY OF THE INVENTION

The present invention avoids the shortcomings of the prior known composters and composting techniques by provision of a new and improved bio-catalytic oxidation reactor and process of optimizing the oxidation-reduction of organic matter.

The above objects are realized in the present invention by provision of a bio-reactor for oxidation of organic matter under near-ideal conditions and in minimum time and with optimum efficiency in either a batch or continuous-flow mode.

The present bio-reactor includes a closed cylindrical vessel which is adapted to be filled with organic matter to approximately 90–95% of its volume, and means for oxidizing individual segments of the organic matter while exhausting moisture and gases, such as carbon-dioxide, from the vessel to the atmosphere via a bio-filter. During the oxidation process, the vessel is rotated intermittently and at a controlled rate to enhance reduction of the organic material while avoiding disruption of the decomposition process. Means is provided to monitor and control the temperature within the vessel to ensure a proper environment for complete oxidation of the material at the optimum rate and provide a nutrient-rich, pathogen-free compost.

DRAWINGS

The best mode presently contemplated of carrying out the invention will be understood from the detailed description of the preferred embodiments illustrated in the accompanying drawings in which.

DETAILED DESCRIPTION OF THE INVENTION

Figure 1:
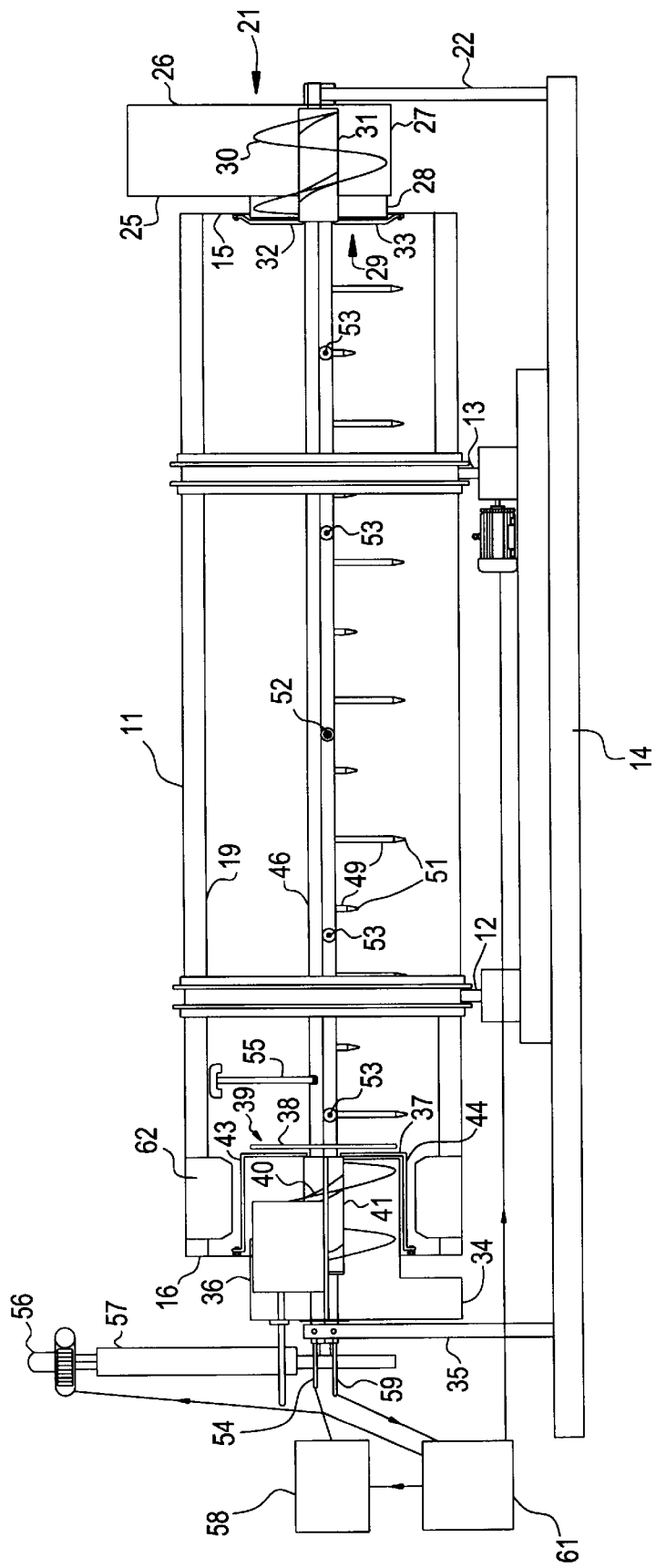
FIG. 1 is a side view in section of a bio-reactor according to the present invention.
Figure 3:
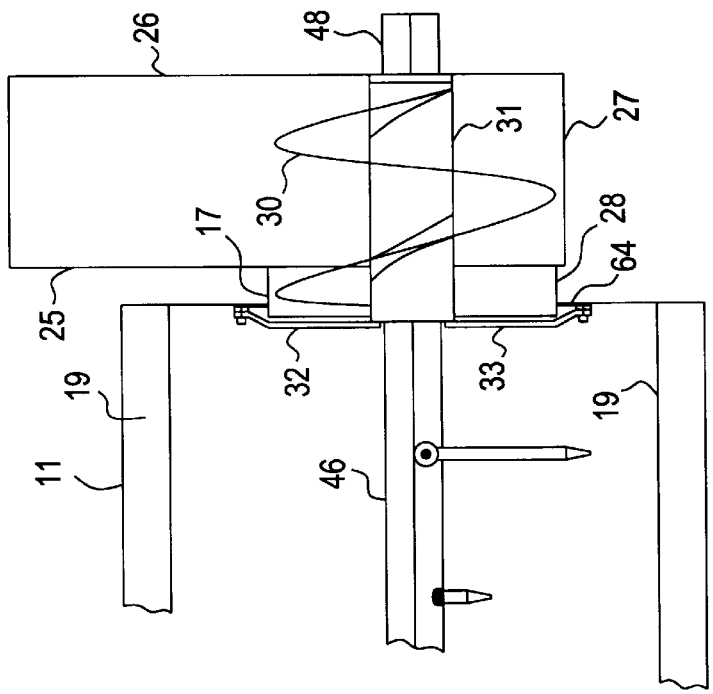
FIG. 3 is a partial side view in section of the loading end of the reactor at an enlarged.
Figure 2:
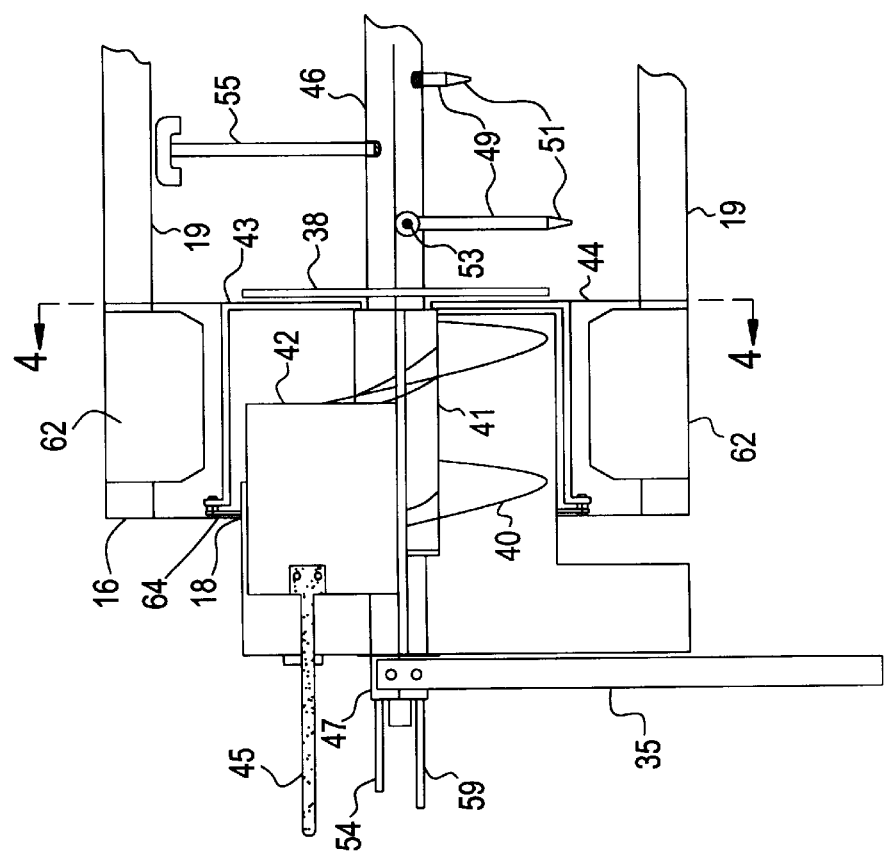
FIG. 2 is a partial side view in section at an enlarged scale of the discharge end of the reactor.
Figure 4:
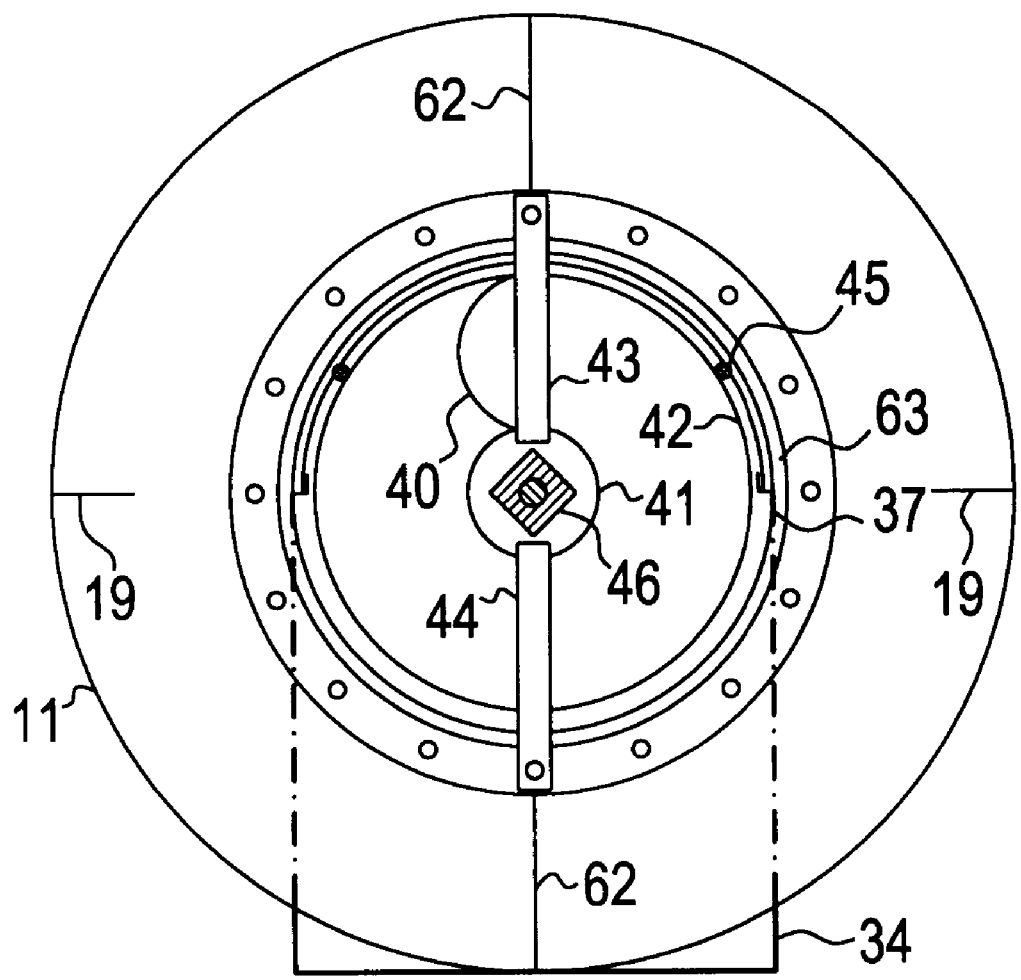
FIG. 4 is an elevation view taken along line 4—4 of FIG. 2.

Referring more particularly to the invention as depicted in FIG. 1 of the drawing, the present bio-reactor includes a cylindrical steel vessel or tank 11 which is supported on two or more pairs of rollers 12, 13 firmly mounted on a pad or deck 14. A motor 20 is operatively connected to the vessel so as to selectively rotate it about its longitudinal axis. The opposite ends of the vessel 11 are closed by annular end sections 15,16 which are provided with centrally-located, circular openings 17,18 of substantial size. A plurality of longitudinal vanes 19 are fixed to the inner surface of the vessel 11 and extend the length thereof, as shown in FIG. 1. A loading chute 21, FIGS. 1 & 3, is mounted on the pad or deck 14 immediately adjacent end section 15 by means of a vertical post 22. The loading chute 21 is provided with side and end panels which define a waste-receiving opening at their upper edges. The side panels 23,24 converge downwardly and their lower edges are joined to the edges of a semi-cylindrical shell 27 which forms the bottom of the chute. The end panels 25,26 extend vertically, with the outer end panel 26 joined to and closing the outer end of the shell 27. The inner end of the shell is formed with a cylindrical collar 28 which is secured to the lower edge of the inner end panel 25. The cylindrical collar 28 is so dimensioned as to be received within the opening 17. A flexible, wear-resistant rubbing seal 64 is clamped to end section 15 surrounding opening 17 and bears against the outer surface of the collar 28. A material feed assembly 29 is mounted on the inner surface of the end section 15 and extends through the collar 28 into close proximity with the outer end panel 26. The feed assembly 29 includes a spiral blade 30 mounted on a hollow cylindrical hub 31 which is telescoped over header 46 and extends almost to the inner surface of end panel 26. Two or more radially-extending support bars 32,33 are bolted to the inner surface of end section 15 on a diameter of opening 17 with their inner ends welded to the inner edge of hub 31.

At the opposite end of the vessel 11, a vertically-extending discharge chute 34 is affixed to a post 35 which is mounted on the pad or deck 14 adjacent end section 16. The discharge chute is provided with a laterally-extending, cylindrical collar 36 which is received within opening 18 in end section 16. The outer surface of collar 36 bears against a flexible, wear-resistant rubbing seal 63 which is clamped to end section 16 surrounding opening 18. The lower portion of the collar 36 is extended to form a semi-cylindrical shell 37 which protrudes into the interior of vessel 11. A circular plate 38 is secured to header 46 adjacent the open end of shell 37. A feed assembly 39 includes a spiral blade 40 surrounding a hollow, cylindrical hub 41 which is telescoped over header 46, and a semi-cylindrical gate or shield 42 which is slidably supported on shell 37. A pair of L-shaped brackets 43,44 are each bolted at one end to the inner surface of end section 16 and extend axially and then radially of the vessel 11 immediately adjacent plate 37 with their opposite extremities welded to the inner edge of hub 41. An operating handle 45 extends through the outer wall of the discharge chute with its inner end attached to gate 42.

The vessel 11 and chutes 21 and 34 are preferably covered with a coating of foamed plastic and an outer layer of elastic vinyl resin to insulate the interior of the reactor from the ambient temperature conditions and inhibit transfer of heat from, or to, the interior of the vessel. The interior surfaces of the reactor may be sprayed with a suitable epoxy resin to resist wear and degradation of the metal.

A tubular header 46 extends along the axis of rotation of vessel 11 and protrudes beyond the end sections 15 and 16. One extremity of the header 46 is secured within a housing 47 which is attached to the exterior of discharge chute 34, and the opposite extremity is slidingly received within a housing 48 attached to the exterior of end panel 26 of loading chute 21. A plurality of tubes 49 of various lengths extend radially at intervals along the length of the header 46 with nozzles 51 at their distal ends. Similarly, a humidity sensor 52 and one or more temperature probes 53 are mounted on the header with electrical leads (not shown) carried by the header and brought out through a conduit 59 on housing 47. The header 46 is mounted so as to resist rotation, such as by keying it to housing 47 or by forming the header and the housings with rectangular cross-sections. The header 46 is preferably formed of square metal tubing and positioned such that the diagonals are vertical and horizontal. The tubes 49 are located on a lower, flat surface of the header and the sensors 52,53 on the other lower surface. A supply of oxygen 58 is connected to housing 47 and header 46 through hose connection 54. A system for exhausting gases from the vessel includes a pipe 55 which extends through housing 47 into header 46 and protrudes vertically from the header to a point above the level of the organic material. An exhaust fan 56 and a bio-filter 57 are attached to the pipe 55 outside of housing 47. A Programmable Logic Controller 61 is connected to the leads from conduit 59 and to the oxygen supply 58 and motor 20. The vanes 19 may be parallel to the axis of vessel 11 or may be slightly skewed to impart slight movement of the organic material toward the discharge chute. The end of each vane adjacent the discharge chute is enlarged to form a paddle 62.

The bio-reactor of the present invention is usable in a batch operation, but is particularly suited for use in a continuous flow mode where new organic matter is continually added to the mixture. When so operated, temperatures within the reactor will vary over its length. At the feed end the reactor should operate near the top of the mesophilic range; at the center it will operate in the thermophilic range; and at the discharge end, again near the mesophilic range.

In the operation of the present bio-reactor, a suitable mixture of organic material, such as animal waste, vegetable waste, carbonaceous and nitrogenous materials, minerals, etc. having a C/N ratio of 15–30: 1, moisture content of approximately 65% and pH of 6.5–7.5, is loaded into the opening of the loading chute 21, preferably by a conveyor, until the vessel is approximately 90–95% full. A suitable bacterial culture is added to the mixture upon start-up. Bacterial activity within the organic mixture is enhanced to produce a near maximum rate of decay at all points within the reactor. This is achieved by injection of oxygen at intervals over the length of the vessel, through hose connection 54, header 46, tubes 49 and nozzles 51, such that it percolates throughout the organic mixture. Temperatures at the inlet end of the vessel are cooled substantially by the addition of new material, while at the discharge end, since thermophilic activity is exhausted in this area, temperatures should be reduced somewhat. Temperatures at the longitudinal center of the vessel are controlled by adjusting the oxygen content of the atmosphere within the vessel through control of the quantity of oxygen injected into, and/or gases and moisture exhausted from, the interior. The concentration of gases within the vessel, which can dampen the rate of oxidation, may be controlled by exhaust fan 56 acting through bio-filter 57 and pipe 55. Exhausting the bio-off-gasses creates a partial vacuum within the vessel which draws fresh air in through the loading chute. The operating temperatures at the center of the vessel are monitored with temperature probes 53 and maintained at approximately 160° F. by careful metering of the oxygen injected through nozzles 51 and operation of the exhaust fan 56. Readings from the probes 53 are continually transmitted to the controller 61 where they are processed according to a predetermined program to produce signals for controlling the emission of oxygen from supply 58 and the operation of exhaust fan 56. The oxidation process at the center of the vessel is sensitive to the rate of oxygen supplied, in that, too little tends to starve the process, while too much tends to cool it. In either case, the decay rate will be reduced and the composting process correspondingly slowed. The moisture content of the material can be monitored with the humidity sensor 52 and adjustment made by exhausting gases from the vessel or by addition of dry material to the material being added. The vessel is rotated slowly and intermittently, according to the predetermined program, while the vessel is being filled, and thereafter, to tumble the mixture while avoiding unnecessary disruption of the actinomycetes activity. To allow the actinomycetes to grow and spread in the mixture, during each six-minute period of normal operation the vessel can be rotated one quarter turn at the rate of four minutes per revolution and then can be at rest for five minutes. This schedule is typical, but other schedules may be equally effective. The blade 30 forms a screw or auger which moves material from the shell 27 through the collar 31 into the vessel as the feed assembly 33 is rotated along with the vessel. The rotational movement of the vanes 19, along with pressure from the new material being added by the feed assembly 29, causes the material within the vessel to slowly migrate toward end section 16. When the reduction process is completed, normally within approximately 48 to 72 hours, the oxidized material is then dropped into shell 37 where it is transported by blade 40 through collar 36 and discharge chute 34. During the decay process, gases, primarily carbon dioxide, are evacuated through the bio-filter 57 which effectively removes any offensive odors via aerobic bacteria on the filter medium. The combination of oxygen in the material and temperatures of approximately 160° F., along with the antibiotic action of the actinomycetes products, will kill all pathogens in the material mixture and result in the compost being pathogen free.

While the invention has been described with reference to specifically illustrated preferred embodiments, it should be realized that various changes may be made without departing from the disclosed inventive subject matter particularly pointed out and claimed herebelow.

What we claim is:

1. A bio-catalytic reactor for continuous flow oxidation of organic wastes which includes a loading chute and a discharge chute aligned with and spaced from each other, said chutes being fixed in position; an elongated cylindrical vessel positioned between said chutes and supported for rotation about its longitudinal axis on pairs of rollers, said vessel having an annular end plate adjacent each chute, each end plate having a centrally-located opening, each chute having a cylindrical collar received within the opening in the adjacent end plate; a rubbing seal located between each cylindrical collar and the adjacent end plate; a feed asssembly located at each end of said vessel, each feed assembly including a movable member which protrudes through the collar of the associated chute and is mounted on the adjacent end plate so as to rotate therewith; and an elongated tubular header positioned along the longitudinal axis of the vessel and supported on the two chutes.

2. A bio-catalytic reactor as defined in claim 1 in which each feed assembly includes a spiral blade mounted on a hollow hub which is telescoped over said header, each hub being mounted on the interior of the adjacent end plate.

3. A bio-catalytic reactor as defined in claim 2 which includes a series of tubes connected to and projecting from said header; oxygen supply means connected to said header and tubes for injecting oxygen into said vessel; and at least one temperature sensor mounted on said header.

4. A bio-catalytic reactor as defined in claim 3 which includes a programmable logic controller connected to said temperature sensor and operatively connected to said oxygen supply means for controlling the injection of oxygen in response to temperatures within said vessel in accordance with a predetermined program.

5. A bio-catalytic reactor as defined in claim 4 which includes a pipe extending axially within and projecting vertically from said header; and an exhaust fan and a bio-filter connected to said pipe for removing gases from said vessel.

6. A bio-catalytic reactor as defined in claim 5 wherein said controller is operatively connected to said exhaust fan to control the build up of gases within said vessel in accordance with a predetermined program.

7. A bio-catalytic reactor as defined in claim 6 which includes a motor operatively connected to rotate said vessel, said controller being operatively connected to said motor.

8. A bio-catalytic reactor as defined in claim 2 in which the collar of the discharge chute includes a semi-cylindrical shell which protrudes into the interior of the vessel below the feed assembly, and a circular plate secured to the header adjacent the shell.

9. A bio-catalytic reactor as defined in claim 8 which includes a semi-cylindrical shield slidably supported on the shell above the feed assembly; and an operating handle attached to said shield and extending to the exterior of the discharge chute.

10. A bio-catalytic reactor as defined in claim 9 which includes a plurality of radially extending paddles mounted on the interior of the vessel in proximity with said shell to drop material onto the feed assembly when the shield has been opened by the operating handle.

11. A bio-catalytic reactor for continuous flow oxidation of organic wastes which includes a loading chute and a discharge chute aligned with and spaced from each other, said chutes being fixed in position; an elongated cylindrical vessel positioned between said chutes and supported for rotation about its longitudinal axis on pairs of rollers, said vessel including an annular plate affixed to each end thereof adjacent each chute, each such plate having a centrally-located circular opening; said discharge chute having a cylindrical collar received within the opening in the adjacent plate; a feed assembly located adjacent the discharge chute, said feed assembly including a movable member which protrudes through said collar into the vessel and is mounted on the interior of the adjacent plate; and an elongated tubular header positioned along the longitudinal axis of the vessel and supported on the two chutes.

12. A bio-catalytic reactor as defined in claim 11 in which the feed assembly includes a spiral blade mounted on a hollow cylindrical hub which is telescoped over said header.

13. A bio-catalytic reactor as defined in claim 12 in which the collar of the discharge chute includes a semi-cylindrical shell which protrudes into the interior of the vessel below the feed assembly; and a circular plate secured to the header adjacent said shell.

14. A bio-catalytic reactor as defined in claim 13 which includes a plurality of radially extending paddles mounted on the interior of the vessel in proximity with said shell to drop material onto the feed assembly as the vessel is rotated.

15. A bio-catalytic reactor as defined in claim 14 which includes a semi-cylindrical shield slidably supported on the shell above the feed assembly; and an operating handle attached to said shield and extending to the exterior of the discharge chute.

* * * * *